(12) United States Patent
Schmid et al.

(10) Patent No.: US 7,174,294 B2
(45) Date of Patent: Feb. 6, 2007

(54) SPEECH PLATFORM ARCHITECTURE

(75) Inventors: Philipp Heinz Schmid, Mercer Island, WA (US); Robert Lewis Chambers, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 637 days.

(21) Appl. No.: 10/177,068

(22) Filed: Jun. 21, 2002

(65) Prior Publication Data
US 2003/0234818 A1  Dec. 25, 2003

(51) Int. Cl.
G10L 15/00 (2006.01)
G10L 19/00 (2006.01)
G10L 13/00 (2006.01)
G06F 9/44 (2006.01)

(52) U.S. Cl. ............. 704/231; 704/201; 704/260; 717/108

(58) Field of Classification Search ............ None
See application file for complete search history.

(56) References Cited

U.S. PATENT DOCUMENTS

| | | | |
|---|---|---|---|
| 6,934,756 B2* | 8/2005 | Maes | 709/227 |
| 2002/0055844 A1* | 5/2002 | L'Esperance et al. | 704/260 |
| 2005/0055844 A1* | 5/2002 | L'Esperance et al. | 704/260 |
| 2003/0069727 A1* | 4/2003 | Krasny et al. | 704/228 |

OTHER PUBLICATIONS

"Talk to Your Computer and Have it Answer Back with the Microsoft Speech API", by Mike Rozak, Microsoft Systems Journal, Jan. 1996; "www.microsoft.com/msj/archive S233.aspx".*
Mike Rozak, "Talk to Your Computer and Have It Answer Back with the Microsoft Speech API", Jan. 1996, pp. 1-21, "http://www.microsoft.com/msj/archive/S233.aspx".*
"Providing Integrated Toolkit-Level Support for Ambiguity in Recognition-Based Interfaces", by Jennifer Mankoff et al., Proceedings of the SIGCHI conference on Human factors in computing systems, pp. 368-375, Apr. 1-6, 2000, http://delivery.acm.org/10.1145/340000/332459/   p368-mankoff.pdf?key1=332459&key2=6721570611&coll=ACM&dl=ACM&CFID=1529328&CFTO.*

* cited by examiner

Primary Examiner—Wei Zhen
Assistant Examiner—Chih-Ching Chow
(74) Attorney, Agent, or Firm—Lee & Hayes, PLLC (57) ABSTRACT

A speech platform architecture is described that provides standardized methods of interaction for users across multiple speech-enabled applications. Listener objects corresponding to speech-enabled applications are used to provide speech functionality to the speech-enabled applications. A common "What Can I Say?" user interface allows users to easily understand what voice commands are available for a particular speech-enabled application. A common configuration user interface is provided that allows users to configure each listener object. Utilization of particular interfaces provides for the common functionality described. As a result of providing common interfaces, users can more easily learn and use multiple speech-enabled applications utilized with a speech system.

44 Claims, 4 Drawing Sheets

SPEECH PLATFORM ARCHITECTURE

TECHNICAL FIELD

The systems and methods described herein relate to speech systems. More particularly, the systems and methods described herein relate to a speech platform architecture that utilizes modular listener objects to provide uniform speech functionality to multiple speech-enabled applications.

BACKGROUND

Computer operating systems and user interfaces associated with them have evolved over several years into very complex software programs that are difficult to learn, master and thereby leverage the full potential of the programs. Many operating systems include a speech interface, as speech is a natural way for people to communicate and express ideas and commands.

Most operating systems that utilize a speech interface provide a low level interface that allows speech-enabled applications to work with the operating system. Such a low level interface provides basic speech functionality to the speech-enabled applications. Consequently, each speech-enabled application must provide a higher level of interface to a user. As a result, each speech-enabled application typically is very different from other speech-enabled applications, as far as a user is concerned. The user may have to interact very differently with each speech-enabled application that the user works with. This makes it very difficult for the user to work with multiple speech-enabled applications and limits the user's computing experience.

An operating system that incorporates a high level speech user interface in which common speech interactions can be standardized across multiple speech-enabled applications would provide a uniform speech experience to a user, no matter how many speech-enabled applications the user utilizes. As a result, a user can more easily learn speech interactions and develop speech system skills.

SUMMARY

Systems and methods are described for providing an extensible speech platform architecture that can be utilized by multiple speech-enabled applications to provide a uniform speech user experience across the different applications.

The architecture is a platform for speech recognition services for a desktop, i.e., operating system speech user interface (SUI). A user can manipulate the desktop and its components using voice commands. Voice commands, or groups of voice commands, are implemented by listener objects (or, listeners) associated with speech-enabled applications. The listener objects are hosted by the platform's run-time component that manages the configuration of the listeners via a consolidated configuration user interface, relays notification events to and from a speech recognition subsystem, and gathers and displays information for a "What Can I Say" function that allows a user to query the system for available speech commands. Having the ability to always see which phrases can be spoken at any given point eliminates a great deal of confusion that typically occurs when using a speech user interface. The listener objects implement speech functionality, such as the ability to launch new programs or to switch between running applications.

The platform includes application programming interfaces (APIs) that allow developers to extend the desktop to cover various specific scenarios. The platform provides a common "What Can I Say?" (WCIS) user interface that can optionally be used by the listener objects to implement the WCIS function. The platform also provides a common configuration user interface through which listener objects are configured. This guarantees a unified experience for users.

BRIEF DESCRIPTION OF THE DRAWINGS

A more complete understanding of exemplary methods and arrangements of the present invention may be had by reference to the following detailed description when taken in conjunction with the accompanying drawings wherein.

DETAILED DESCRIPTION

The following describes a speech platform architecture for providing common interfaces and speech functionality to multiple speech-enabled applications. The architecture provides interfaces for listener objects (i.e., listeners) that are associated with speech-enabled applications that allow the listener objects to utilize a configuration manager and/or a "What Can I Say?" manager. The configuration manager and the WCIS manager will be described in greater detail below with regard to the figures.

A speech-enabled application uses a corresponding listener object to provide access to the WCIS manager and the configuration manager. The speech-enabled application can thereby provide configuration and WCIS functionality to users of the speech-enabled application. If the user utilizes multiple speech-enabled applications that each work with a listener object, the user is provided with similar functionality across the multiple applications. As a result, the user's experiences with the speech-enabled applications are standardized and are easier for the user to use. Additionally, the functionality provided through the listener object is extensible so that the speech-enabled application can further build on the provided functionality.

Exemplary Environment

Figure 1:
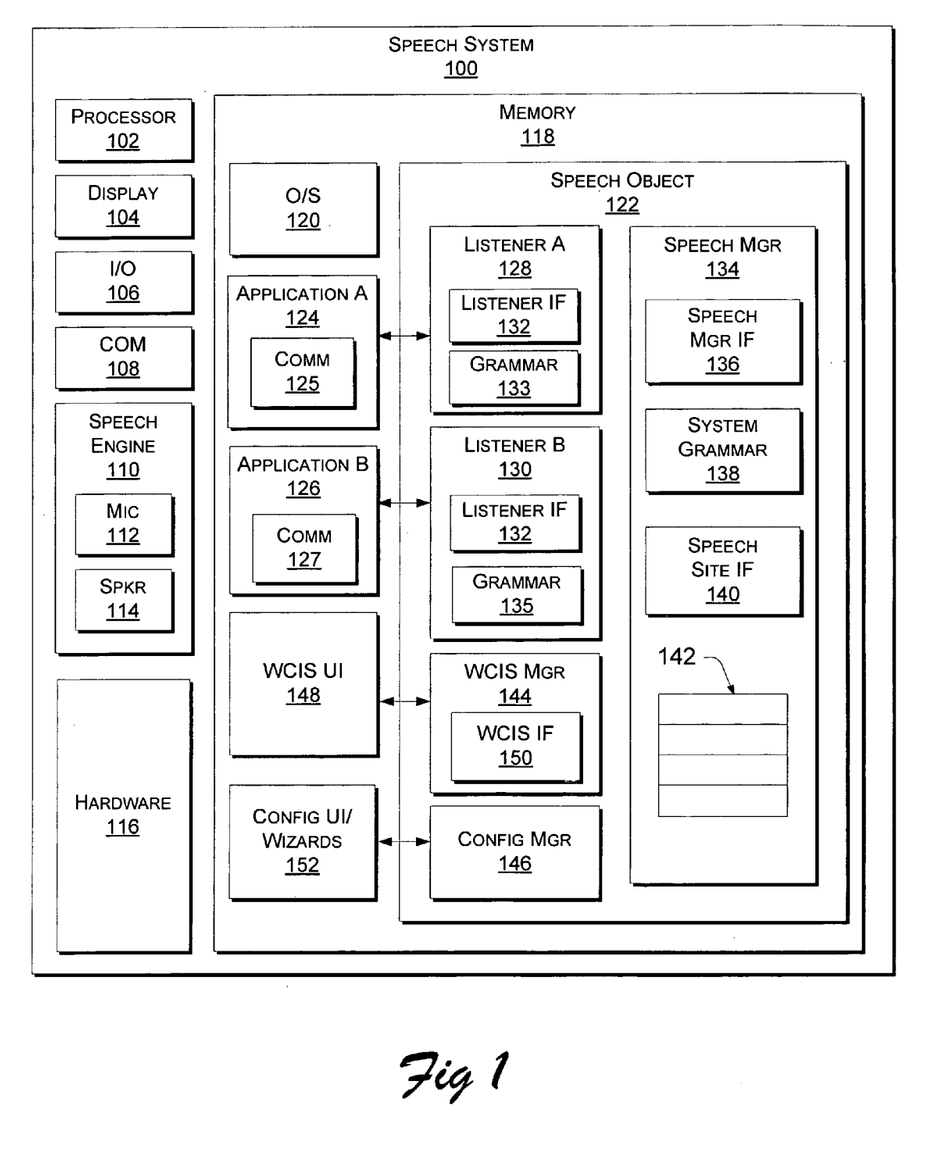
FIG. 1 is a block diagram of a speech system constructed in accordance with the present description.

FIG. 1 is a block diagram of a speech system 100 constructed in accordance with the present description. The speech system 100 includes a processor 102, a display 104, and input/output (I/O) module 106 and a communications module 108. The I/O module 106 is used to control communications with external hardware items (not shown) such as a printer and/or a scanner. The communications module 108 is used to control communications with one or more other systems via a network, such a local area network (LAN) or the Internet.

The speech system 100 further includes a speech engine 110 that has an input device such as a microphone 112 and an output device such as a speaker 114. Various other hardware components 116 utilized by the speech system 100 but not specifically mentioned herein are also included.

The speech system 100 also includes memory 118 typically found in computer systems, such as random access memory (RAM). The memory 118 stores an operating system 120. A speech object 122 that is stored in the memory 118 is shown separate from the operating system 120. However, it is noted that the speech object 122 and its components may also be a part of the operating system 120.

The memory 118 stored a first speech-enabled application, Application A 124 and a second speech-enabled application, Application B 126. Application A 124 is associated with a first listener object, Listener A 128 and Application B 126 is associated with a second listener object, Listener B 130. Listener A 128 includes a listener interface 132 by which Listener A 128 communicates with the speech object 122. Listener A 128 also includes a listener grammar 133 that is a unique speech grammar local to Listener A 128. Listener B 130 also includes the listener interface 132 through which Listener B 130 communicates with the speech object 122. Listener B 130 also includes a listener grammar 135 that is a unique speech grammar local to Listener B 130.

Application A 124 includes a communications path 125 that Application A 124 utilizes to communicate with Listener A 128. Similarly, Application B 126 includes a communications path 127 that Application B 126 utilizes to communicate with Listener B 130. The communication paths 125, 127 may comprise a common interface between the speech-enabled applications 124, 126 and the listener objects 128, 130, or they may comprise a private communication path accessible only by the respective speech-enabled application 124, 126 and listener object 128, 130. The communication paths 125, 127 may remain inactive until the speech-enabled applications 124, 126 activates the communications paths 125, 127 and requests attention from the corresponding listener object 128, 130. Additionally, the communication paths 125, 127 may provide one-way communication between the speech-enabled applications 124, 126 and the listener objects 128, 130 or they may provide two-way communications.

A speech manager 134 is stored in the memory 118 and is the main speech desktop object and it owns the main thread of the speech object 122. The speech manager 134 is used to control communications with the listener objects including dispatching appropriate events. The speech manager 124 exposes a speech manager interface 136 to speech-enabled applications and a speech site interface 140. A system grammar 138 is included in the speech manager 124 and provides a global speech grammar for the speech system 100. A listener table 142 stored in the speech manager 134 maintains a list of currently loaded and executing listeners (in this example, Listener A 128 and Listener B 130).

The speech object 122 also includes a "What Can I Say?" (WCIS) manager 144 and a configuration manager 146. The WCIS manager 144 provides access to a "What Can I Say?" (WCIS) user interface 148 and includes a Speech WCIS interface 150 that the WCIS manager 144 uses to communicate with the speech object 122.

It is noted that the elements depicted in FIG. 1 may not all be required to provide the functionality described herein. Furthermore, additional elements may be included in the speech system 100 without impeding the functionality described herein. The elements shown may also be grouped differently than shown in FIG. 1, so long as the alternative grouping does not significantly alter the functionality as described. The elements previously described and their related functionality will be described in greater detail below.

Speech Manager Interface

As previously noted, the speech manager 134 exposes the speech manager interface 136 to one or more speech-enabled applications, such as Application A 124 and Application B 126. The following discussion of the speech manager interface 136 refers to the speech manager interface 136 as (interface) ISpDesktop 136. ISpDesktop 136 is the nomenclature utilized in one or more versions of the WINDOWS family of operating systems provided by MICROSOFT CORP. Such a designation in the following discussion is for exemplary purposes only and is not intended to limit the platform described herein to a WINDOWS operating system The following is an example of the ISpDesktop 136 interface.

```
Interface ISpDesktop
{
    HRESULTInit( );
    HRESULTRun(
        [in] BOOLfRun);
    HRESULTConfigure([in] BOOLfConfigure);
    HRESULTWhatCanISay(
        [in] BOOLfRun);
    HRESULTShutdown( )
};
```

The "Init" or initialization first sets up the listener connections to the speech recognition engine 110. Once this connection is established, each listener object that is configured by the user to be active (listeners can be inactive if the user has decided to "turn off a listener" via the configuration mechanism) is initialized via a call to the ISpDesktopListener::Init( ) method. The listener object is given a connection to the speech engine 110 to load its speech grammars and set up the notification system.

The "Run" method activates and/or deactivates the speech system 100 functionality. The "Run" method is typically associated with a graphical user interface element or a hardware button to put the system in an active or inactive state.

Figure 2:
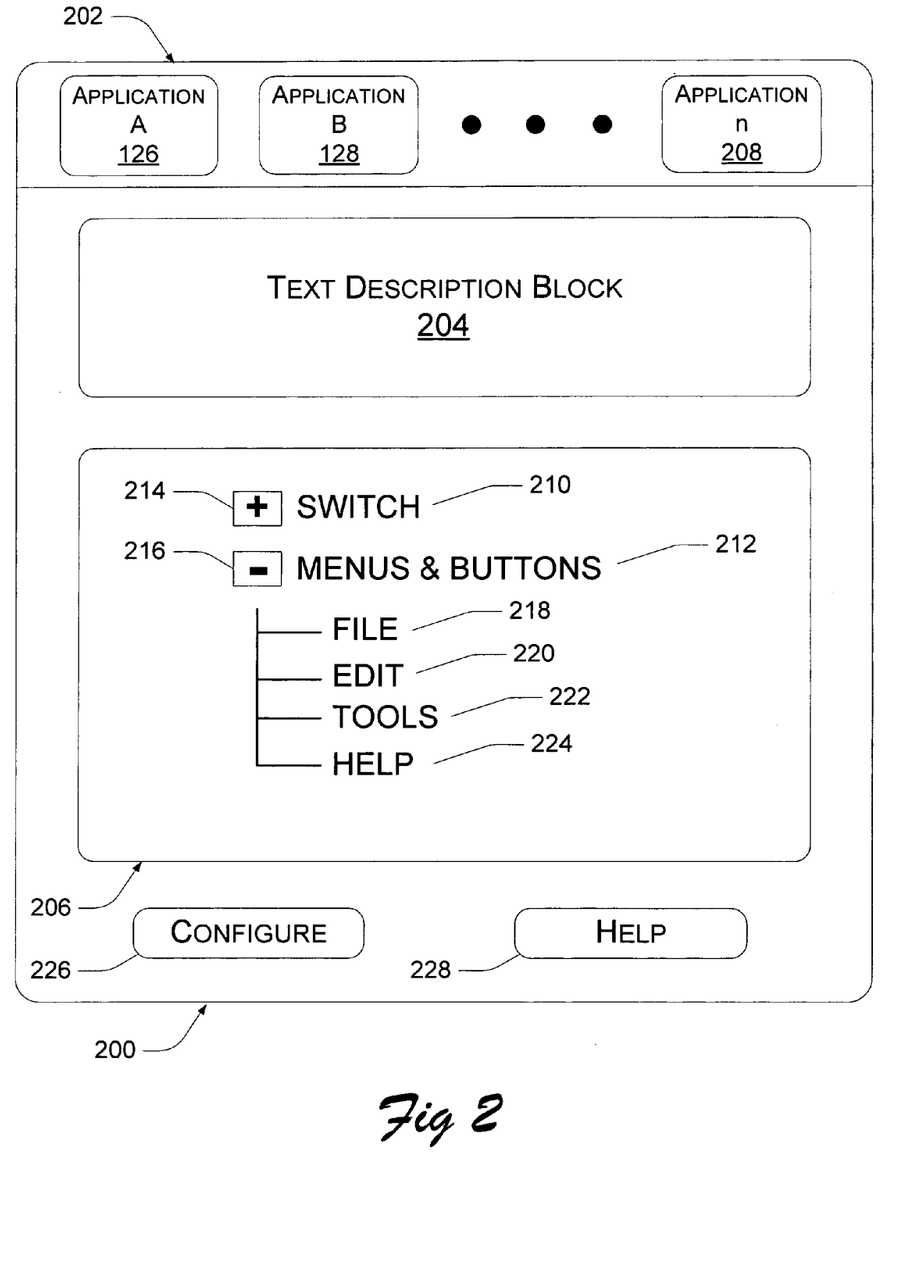
FIG. 2 is an illustration of a common "What Can I Say?" user interface.
Figure 3:
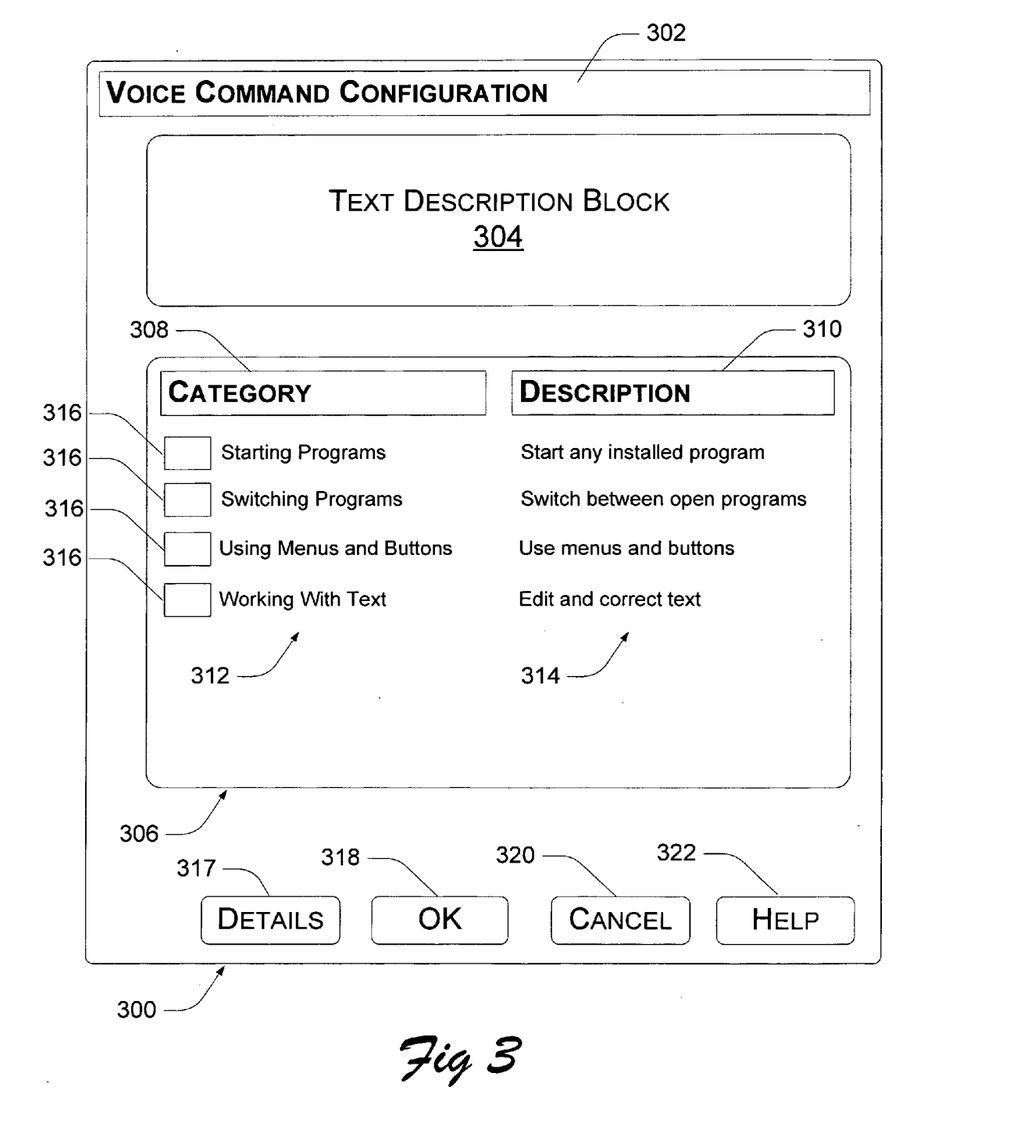
FIG. 3 is an illustration of a common configuration user interface.

The "Configure" method instructs the speech system 100 to display the configuration user interface 152, an example of which is shown in FIG. 2 and discussed in detail below. Similarly, the "WhatCanISay" method instructs the speech system 100 to display a "What Can I Say?" user interface 148, an example of which is shown in FIG. 3 and discussed in detail below. The "Shutdown" method is utilized to shut down the speech system 100.

Listener Interface

As previously noted, each listener object 128, 130 in the speech system 100 exposes the listener interface 132. An exemplary listener interface 132 is shown and described below. The following discussion of the listener interface 132 refers to the listener interface 132 as (interface) ISpDesktopListener 132. ISpDesktopListener 132 is the nomenclature utilized in one or more versions of the WINDOWS family of operating systems provided by MICROSOFT CORP. Such a designation in the following discussion is for exemplary purposes only and is not intended to limit the platform described herein to a WINDOWS operating system The following is an example of the ISpDesktopListener 132 interface.

```
Interface ISpDesktopListener
{
    HRESULTInit( )
        ISpDesktopListenerSite * pSite,
        ISpReco Context * pRecoCtxt),
```

-continued

```
        HRESULTSuspend( );
        HRESULTResume( );
        HRESULTOnFocusChanged(
            DWORD event,
            HWND hwndNewFocus,
            LONG idObject,
            LONG idChild,
            const WCHAR **ppszFocusHierarchy);
        HRESULTWhatCanISay(
            [in] DWORD dwCookie,
            [in] ISpWCIS * pSite;
    };
```

The "Init" method transmits a recognition context (to add to speech grammars) (i.e., ISpRecoContext*pRecoCtxt) and the site to communicate back to the speech system 100 (i.e., ISpDesktopListenerSite*pSite). Each listener object 128, 130 performs their own initialization here, typically by loading or constructing their respective speech grammars.

The "Suspend" method notifies the listeners 128, 130 that the speech system 100 is deactivated. Conversely, the "Resume" method notifies the listeners 128, 130 that the speech system 100 is activated. The listeners 128, 130 can use this information to tailor their particular behavior (e.g., don't update the speech grammars if the speech system 100 is not active).

The "OnFocusChanged" method informs a particular listener 128, 130 that a new speech-enabled application 124 has focus (i.e., a user has highlighted the new speech-enabled application 124). The listener 128 associated with the newly focused speech-enabled application 124 uses this information to activate its grammar. Conversely, a previously active listener (e.g., Listener B 130) that loses focus when focus changes to the newly focused speech-enabled application 124 uses the information to deactivate its grammar.

The "What Can I Say" method is used for the WCIS Manager 144 to notify each listener 128, 130 that a user has requested the WCIS user interface 148 to be displayed. As previously mentioned, the WCIS user interface 148 is shown in FIG. 3 and will be described in greater detail below. The listeners 128, 130 use the ISpWCIS pointer given to them via the WhatCanISay( ) method to provide their WCIS information to the WCIS manager 144 to be displayed on the display 104. The listeners use the dwCookie value to identify themselves if they need to update the information (as is the case for the "Menus & Buttons" listener example shown and described below).

WCIS Interface

The "What Can I Say?" (WCIS) interface 150 is implemented by the What Can I Say? user interface 148 and is used by the listeners 128, 130 to update their WCIS information in that dialogue. An exemplary WCIS interface 150 is shown and described below. The following discussion of the WCIS interface 150 refers to the WCIS interface 150 as (interface) ISpWCIS 150. ISpWCIS 150 is the nomenclature utilized in one or more versions of the WINDOWS family of operating systems provided by MICROSOFT CORP. Such a designation in the following discussion is for exemplary purposes only and is not intended to limit the platform described herein to a WINDOWS operating system The following is an example of the ISpWCIS 150 interface.

```
Interface ISpWCIS
{
    HRESULT UpdateWCIS(
        [in] DWORD dwCookie,
        [in] SPGLOBALSPEECHSTATE eGlobalSpeechState,
        [in] BSTR bstrTitle,
        [in] DWORD cWCISInfo,
        [in] EnumString * pEnumWCISInfo);
};
```

The dwCookie value is used as a unique identifier so stale information can be replaced, if necessary. The eGlobalSpeechState value indicates if this particular listener is active in a Commanding and/or Dictation mode. In one particular implementation, a listener is active when focus is on a Cicero-enabled application to indicate if some of the dictation commands are currently active.

The final three parameters (bstrTitle, cWCISInfo, pEnumWCISInfo) are used to display a category title in the WCIS user interface 148 (bstrTitle) and to retrieve the actual phrases to be displayed under this category (cWCISInfo and pEnuM WCISInfo).

Speech Site Interface

The speech site interface 140 is implemented by the speech manager 134 and provides the listeners 128, 130 (in ISpDesktopListener::Init( )) a way in which to communicate back with the speech manager 134. An exemplary speech site interface 140 is shown and described below. The following discussion of the speech site interface 140 refers to the speech site interface 140 as (interface) ISpDesktopListenerSite 140. ISpDesktopListenerSite 140 is the nomenclature utilized in one or more versions of the WINDOWS family of operating systems provided by MICROSOFT CORP. Such a designation in the following discussion is for exemplary purposes only and is not intended to limit the platform described herein to a WINDOWS operating system The following is an example of the ISpDesktopListenerSite 140 interface.

```
Interface ISpDesktopListenerSite
{
    HRESULTNotifyOnEvent(
        HANDLE hNotifyWhenSignaled,
        ISpNotifySink * pNotify);,
    HRESULTTextFeedback(
        TfLBBalloonStyle style,
        WCHAR * pszFeedback,
        ULONG cch);
};
```

The NotifyOnEvent method instructs the speech object 122 to call the notification sink when the hNotifyWhenSignaled handle is signaled. This allows the listeners 128, 130 to set up a notification callback mechanism without having to implement their own thread to monitor it. A "Program Launch" listener, for example, uses this to monitor for any changes in the file system (e.g., addition of new programs).

The TextFeedback method is used by the listeners 128, 130 to inform a user of pending actions. For example, a "Program Launch" listener uses this method to inform the user that it is about to launch an application. This is very useful in a case where starting up a new application takes some time and assures the user that an action was taken. The TfLBBalloonStyle method is used by a WINDOWS component (called Cicero) to communicate the text to any display object that is interested in this information. The pszFeedback and cch parameters are the feedback text and its length in count of characters respectively.

WCIS User Interface

FIG. 2 is an illustration of an exemplary "What Can I Say?" (WCIS) user interface 200 (FIG. 1, 148). The WCIS user interface 200 is generally utilized by a user to display commands that are available to the user for one or more active speech-enabled applications. It is noted that the WCIS user interface 200 shown in FIG. 2 is for example purposes only and is not meant to limit different implementations of one or more WCIS user interfaces. In the following discussion, continuing reference will be made to the elements and reference numerals shown and described in FIG. 1.

The WCIS user interface 200 includes a current application display bar 202, a text description block 204, and a command block 206. The current application display bar 202 is an area of the WCIS user interface 200 where brief descriptions, or titles, of currently running speech-enabled applications 124, 126 are displayed. A user may highlight each speech-enabled application 124, 126 to show the commands available for the highlighted application. In the present example, the current application display bar depicts speech-enabled Application A 124 and speech-enabled Application B 126. Speech-enabled Application n 208 is also shown to illustrate that there may be more than two speech-enabled applications active in the speech system 100.

The text description block 204 is a more detailed title and/or description of a speech-enabled application 124, 126, 208 highlighted in the current application display bar 202. The text description block 204 may simply contain the title of the highlighted application, or it may contain more detailed information, such as a short description of what the application does. In one implementation, both a title and a description of the highlighted application are displayed.

The command block 206 displays one or more speech-enabled functions available in a speech-enabled application 124, 126, 208 highlighted in the current application display bar. In the present example, a "Switch" function 210 and a "Menus & Buttons" function 212 are shown. Additionally, an expansion control button 214 is shown next to the "Switch" function 210 and indicates that the "Switch" function 210 contains other sub-functions (not shown) that may be displayed by actuating the expansion control button 214. If the expansion control button 214 is actuated, then the expansion control button 214 is replaced with a contraction control button (see below).

Shown next to the "Menus & Buttons" function 212 is a contraction control button 216 that indicates that the sub-functions shown under the "Menus & Buttons" function 212 may be contracted within the "Menus & Buttons" function 212 so that they are no longer displayed. If the contraction control button 216 is actuated, then the contraction control button will display an expansion control button in its place.

Sub-items shown under the "Menus & Buttons" function 212 include a "File" sub-function 218, an "Edit" sub-function 220, a "Tools" sub-function 222 and a "Help" sub-function 224. The sub-functions 218–224 being displayed indicate that the user may speak the sub-function names as commands to the speech system 100. These particular commands would probably be interim commands that would precede a command included in the sub-function. Furthermore, the user may highlight each sub-function 218–224 to see if there are available commands subordinate to the sub-functions that may be issued to the speech system 100.

The "File" sub-function 218 includes subordinate commands that may be issued to the speech system 100 to manipulate files (not shown) within the speech system 100. The "Edit" sub-function 220 includes commands that may be issued to edit files in the speech system 100. The "Tools" sub-function 222 includes commands that are issued to control tools available for use in the speech system 100. The "Help" sub-function 224 includes commands that may be issued to access help information in the speech system 100. These sub-functions 218–224 are well known in the art and will not be explained in greater detail herein.

The WCIS user interface 200 also includes a "Configure" button 226 and a "Help" button 228. The "Configure" button 226, when actuated launches the configuration user interface (described below) used to activate or deactivate individual listeners and to configure specific listeners in more details. The "Help" button 228, when actuated, access user help information in the speech system 100.

As previously stated, the WCIS user interface 200 illustrated in FIG. 2 is exemplary only. Other features not shown may also be included in the WCIS user interface 200. Likewise, features shown in the WCIS user interface 200 may be omitted from an implemented WCIS user interface.

Configuration User Interface

FIG. 3 is an illustration of a configuration user interface 300 (FIG. 1, 152). The configuration user interface 300 is generally utilized by a user to display configuration options for each of one or more listeners 128, 130 in the speech system 100. It is noted that the configuration user interface 300 shown in FIG. 3 is for example purposes only and is not meant to limit different implementations of one or more other configuration user interfaces. In the following discussion, continuing reference will be made to the elements and reference numerals shown and described in FIG. 1.

The configuration user interface 300 includes a title bar 302, a text description block 304 and a main block 306. The title bar 302 displays a title of the currently displayed page—in this case, "Voice Command Configuration." The text description block 304 displays a more detailed description of the currently displayed page. In this example, such a description might be "Voice Command Configuration Setup For Listeners" or "Configure Listeners For Voice Commands."

The main block 306 displays the configuration options available for each listener 128, 130 utilized with the speech system 100. In the present example, the main block 306 includes a category heading 308 and a description heading 310. Several categories 312 are listed under the category heading 308 and several descriptions 314 are listed under the description heading 310. There is a one-to-one correspondence between the categories 312 and the descriptions.

A checkbox 316 is included beside each category 312. When a checkbox 316 is checked, it means that a user has selected the category 312 shown beside the checked checkbox 316. Conversely, if a checkbox 316 is cleared, it means that the user has not selected the category 312 shown beside the cleared checkbox 316.

Each of the categories 312 describes a configuration features that a user may activate for a listener. One category 312 shown is "Starting Programs." The description 314 associated with "Starting Programs" is "Start any installed program." If the user wishes to enable the "Starting Programs" feature with a particular listener, the user checks the checkbox 316 associated with the "Starting Programs" category 312. Enablement of the "Starting Programs" feature allows a listener to be configured to provide voice commands for launching one or more programs.

Another category 312 shown is "Switching Programs." The "Switching Programs" feature allows a listener to be configured to provide speech commands for switching from one program to another. The description 314 associated with "Switching Programs" states "Switch between open programs." A user may enable to "Switching Programs" feature by checking the checkbox 316 associated with the "Switching Programs" category 312.

A third category 312 shown in the configuration user interface 300 is a "Using Menus & Buttons" category 312. The description 314 associated with this category reads "Use menus and buttons." A user may configure a listener to provide voice commands for menu and button configuration and use by checking the checkbox 316 associated with the "Menus & Buttons" category 312.

Another category 312 shown is a "Working With Text" category 312. The description 314 associated with the "Working With Text" category 312 is "Edit and correct text." Checking the checkbox 316 associated with the "Working With Text" category 312 enables a listener 128, 130 to provide voice commands for editing text files.

The list of categories 312 shown in the present example is not exhaustive and other categories 312 not shown may be included. Furthermore, an implementation of the configuration user interface 300 is not required to include any or all of the categories 312 and related description 314 shown in the present example.

The configuration user interface 300 also includes a "Details" button 317, an "OK" button 318, a "Cancel" button 320, and a "Help" button 322. The "Details" button 317 is enabled whenever the selected category of listener is providing a secondary user interface for a more detailed configuration of the listener. The "OK" button 318 is actuatable and, when actuated, saves the selected configuration after the configuration has been changed. The "Cancel" button 320 is actuatable and, when actuated, discards any changes made to the configuration since the last time the configuration was changed. The "Help" button 322 is actuatable and, when actuated, provides help instructions to a user.

As previously mentioned, the elements shown in the configuration user interface 300 are exemplary only and any or all of the elements shown in FIG. 3 may be included in an implementation of a configuration user interface. In addition, other elements not shown or described may also be included in a configuration user interface. However, it is important to note that a common configuration user interface is available to a user for each listener that may be added to the speech system 100. As a result, a more pleasant and uniform user experience is provided for the speech system 100, no matter what or how many speech-enabled applications are utilized with the speech system 100.

Exemplary Computer Environment

Figure 4:
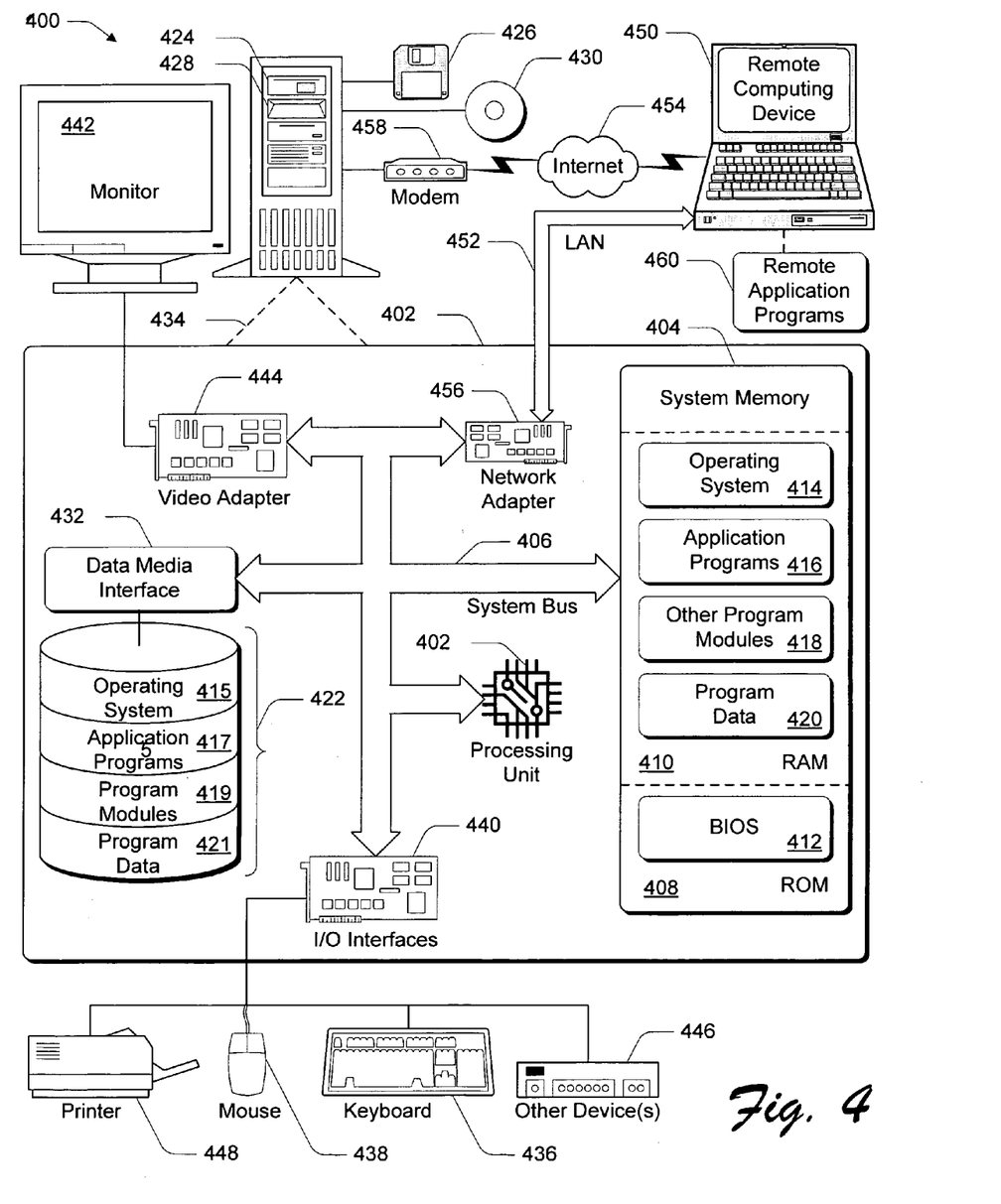
FIG. 4 is a diagram of an exemplary system on which the present invention may be implemented.

The various components and functionality described herein are implemented with a number of individual computers. FIG. 4 shows components of typical example of such a computer, referred by to reference numeral 400. The components shown in FIG. 4 are only examples, and are not intended to suggest any limitation as to the scope of the functionality of the invention; the invention is not necessarily dependent on the features shown in FIG. 4.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 4, the components of computer 400 may include, but are not limited to, a processing unit 402, a system memory 404, and a system bus 406 that couples various system components including the system memory to the processing unit 402. The system bus 406 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 400 typically includes a variety of computer-readable media. Computer-readable media can be any available media that can be accessed by computer 400 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 400. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 404 includes computer storage media in the form of volatile and/or nonvolatile memory such as read only memory (ROM) 408 and random access memory (RAM) 410. A basic input/output system 412 (BIOS), containing the basic routines that help to transfer information between elements within computer 400, such as during start-up, is typically stored in ROM 408. RAM 410 typically contains data and/or program modules that are immediately accessible to and/or presently being operated on by processing unit 402. By way of example, and not limitation, FIG. 4 illustrates operating system 414, application programs 416, other program modules 418, and program data 420.

The computer 400 may also include other removable/non-removable, volatile/nonvolatile computer storage media. By way of example only, FIG. 4 illustrates a hard disk drive 422 that reads from or writes to non-removable, nonvolatile magnetic media, a magnetic disk drive 424 that reads from or writes to a removable, nonvolatile magnetic disk 426, and an optical disk drive 428 that reads from or writes to a removable, nonvolatile optical disk 430 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 422 is typically connected to the system bus 406 through a non-removable memory interface such as data media interface 432, and magnetic disk drive 424 and optical disk drive 428 are typically connected to the system bus 406 by a removable memory interface such as interface 434.

The drives and their associated computer storage media discussed above and illustrated in FIG. 4 provide storage of computer-readable instructions, data structures, program modules, and other data for computer 400. In FIG. 4, for example, hard disk drive 422 is illustrated as storing operating system 415, application programs 417, other program modules 419, and program data 421. Note that these components can either be the same as or different from operating system 414, application programs 416, other program modules 418, and program data 420. Operating system 415, application programs 417, other program modules 419, and program data 421 are given different numbers here to illustrate that, at a minimum, they are different copies. A user may enter commands and information into the computer 400 through input devices such as a keyboard 436 and pointing device 438, commonly referred to as a mouse, trackball, or touch pad. Other input devices (not shown) may include a microphone, joystick, game pad, satellite dish, scanner, or the like. These and other input devices are often connected to the processing unit 402 through an input/output (I/O) interface 440 that is coupled to the system bus, but may be connected by other interface and bus structures, such as a parallel port, game port, or a universal serial bus (USB). A monitor 442 or other type of display device is also connected to the system bus 406 via an interface, such as a video adapter 444. In addition to the monitor 442, computers may also include other peripheral output devices 446 (e.g., speakers) and one or more printers 448, which may be connected through the I/O interface 440.

The computer may operate in a networked environment using logical connections to one or more remote computers, such as a remote computing device 450. The remote computing device 450 may be a personal computer, a server, a router, a network PC, a peer device or other common network node, and typically includes many or all of the elements described above relative to computer 400. The logical connections depicted in FIG. 4 include a local area network (LAN) 452 and a wide area network (WAN) 454. Although the WAN 454 shown in FIG. 4 is the Internet, the WAN 454 may also include other networks. Such networking environments are commonplace in offices, enterprise-wide computer networks, intranets, and the like.

When used in a LAN networking environment, the computer 400 is connected to the LAN 452 through a network interface or adapter 456. When used in a WAN networking environment, the computer 400 typically includes a modem 458 or other means for establishing communications over the Internet 454. The modem 458, which may be internal or external, may be connected to the system bus 406 via the I/O interface 440, or other appropriate mechanism. In a networked environment, program modules depicted relative to the computer 400, or portions thereof, may be stored in the remote computing device 450. By way of example, and not limitation, FIG. 4 illustrates remote application programs 460 as residing on remote computing device 450. It will be appreciated that the network connections shown are exemplary and other means of establishing a communications link between the computers may be used.

CONCLUSION

The systems and methods as described thus provide a common user experience for certain functions for multiple speech-enabled applications. A user is thus provided with similar user interfaces for certain speech system functions no matter which speech-enabled application the user is currently working with. Speech-enabled applications are, therefore, easier for the user to learn to work with and provide for a more enjoyable and meaningful experience.

Although the described systems and methods have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

The invention claimed is:

1. A speech system implemented at least in part by a processor, comprising:
   multiple listener objects embodied on a computer-readable storage medium, each listener object configured to implement a set of speech functions particular to a corresponding speech-enabled application, wherein each of the multiple listener objects is implemented in the speech system when a corresponding speech-enabled application is utilized;

a speech manager configured to provide basic speech user interface functionality, to maintain a list of loaded and executing listener objects, to set up connections between listener objects and a speech recognition engine, and to manage interactions with the multiple listener objects by controlling communications with the multiple listener objects, wherein the speech manager dispatches communication events to the multiple listener objects based on the list.

2. The speech system as recited in claim 1, further comprising a speech engine that includes a text-to-speech (TTS) component and a sound recognition (SR) component.

3. The speech system as recited in claim 1, wherein the speech manager further comprises a system grammar that provides the basic speech user interface functionality.

4. The speech system as recited in claim 3, wherein the system grammar is a global grammar.

5. The speech system as recited in claim 1, wherein at least one of the multiple listener objects further comprises a local listener grammar that is utilized by the speech-enabled application that corresponds to the listener object.

6. The speech system as recited in claim 1, further comprising a user interface (UI) manager configured to provide a speech user interface (SUI), the SUI being provided for each listener object implemented in the system.

7. The speech system as recited in claim 6, wherein the speech user interface further comprises a "What Can I Say?" user interface.

8. The speech system as recited in claim 6, wherein the speech user interface further comprises a configuration user interface.

9. The speech system as recited in claim 1, wherein the speech manager is further configured to display at least a subset of a set of speech commands associated with a particular speech-enabled application.

10. The speech system as recited in claim 1, further comprising a configuration manager through which each of the multiple objects can be specifically configured to provide access to certain speech system features by each of the corresponding speech-enabled applications.

11. A speech program stored on one or more computer-readable storage media, comprising:

multiple listeners, each listener corresponding to a speech-enabled application and configured to implement a set of speech functions required by the corresponding speech-enable application;

a user interface configured to provide a common user interface for use by each of the multiple listeners; and a speech manager configured to provide basic speech functions, to maintain a list of loaded and executing listener objects, to set up connections between listener objects and a speech recognition engine, and to manage interactions between the speech program, the speech manager, the user interface and the multiple listeners, wherein the speech manager dispatches communication events to the multiple listeners based on the list.

12. The speech program as recited in claim 11, wherein the user interface further comprises a "What Can I Say?" user interface that identifies at least a subset of the set of speech functions available with a particular listener.

13. The speech program as recited in claim 11, wherein the set of speech functions further comprises a set of speech commands.

14. The speech program as recited in claim 11, wherein the set of speech functions further comprises a speech grammar.

15. The speech program as recited in claim 11, further comprising a configuration manager accessible by each of the multiple listeners and to enable speech program features to be enabled and/or disabled for each listener via a common configuration user interface.

16. The speech program as recited in claim 11, wherein the user interface further comprises a configuration interface that allows specific speech program features to be activated or de-activated for each listener.

17. The speech program as recited in claim 16, wherein at least some of the specific speech program features further comprises voice commands available though the speech program.

18. The speech program as recited in claim 11, wherein the user interface further comprises a visual interface.

19. The speech program as recited in claim 11, wherein the user interface further comprises an audio interface.

20. The speech program as recited in claim 11, wherein the user interface further comprises a hierarchical display that shows, on demand, speech commands available through the multiple listeners and the speech manager.

21. A listener object stored on one or more computer-readable storage media, comprising:

a speech grammar associated with a speech-enabled application, the speech grammar providing a coherent first set of speech functions specific to the speech-enabled application;

a listener interface through which the listener object communicates with a speech system that provides a second set of speech functions to the speech-enabled application and to one or more other speech-enabled applications;

wherein the listener object receives communication events dispatched by a speech manager to a list of loaded and executing listener objects maintained by the speech manager; and wherein implementation of the listener object provides the speech-enabled applications with the second set of speech functions in a uniform manner as the second set of speech functions are provided to one or more other listener objects.

22. The listener object as recited in claim 21, wherein the second set of speech functions includes a "What Can I Say?" function that identifies one or more speech commands that are available to a user for at least one or the speech-enabled applications.

23. The listener object as recited in claim 22, wherein the one or more speech commands are identified through a graphical user interface.

24. The listener object as recited in claim 22, wherein the one or more speech commands are identified through a speech user interface.

25. The listener object as recited in claim 21, wherein the second set of speech functions includes a configuration manager that is configured to enable features included in the second set of speech features to be enabled and/or disabled for each listener object.

26. A speech-enabled application implemented by a processor, the speech-enabled application comprising:

one or more functions controllable by a speech grammar;

communications path configured to enable the speech-enabled application to communicate with a listener object associated with the speech-enabled application, the listener object receiving communication events dispatched by a speech manager based on a list of loaded and executing listener objects maintained by the speech manager, and implementing the speech grammar within a speech system.

27. The speech-enabled application as recited in claim 26, wherein the communications path further comprises an interface between the speech-enabled application and the listener object.

28. The speech-enabled application as recited in claim 26, wherein the communications path further comprises a private communication path accessible only by the speech-enabled application and the listener object.

29. The speech-enabled application as recited in claim 26, wherein the communications path is inactive until the speech-enabled application activates the communications path and requests attention from the listener object.

30. The speech-enabled application as recited in claim 26, wherein the communications path provides one-way communication from the speech-enabled application to the listener object.

31. The speech-enabled application as recited in claim 26, wherein the communications path provides two-way communication between the speech-enabled application and the listener object.

32. A speech system implemented at least in part by a processor, comprising:
multiple listener objects embodied on a computer-readable storage medium, each listener object configured to provide access to a common "What Can I Say?" (WCIS) user interface that allows a user to know what speech commands are available for use with a speech-enabled application associated with the listener object, the speech-enabled application running on the speech system;
a listener grammar associated with each listener object that provides a local speech grammar to the speech-enabled application associated with the listener object; and
a speech manager configured to provide a global system speech grammar to each speech-enabled application, to maintain a list of loaded and executing listener objects, to set up connections between listener objects and a speech recognition engine, and to control communications between the speech system and each listener object, wherein the speech manager dispatches communication events to one or more of the multiple listener objects based on the list.

33. The speech system as recited in claim 32, further comprising a configuration user interface commonly provided for each listener object, the configuration user interface enabling configuration features to be enabled or disabled for a particular listener object.

34. A speech system implemented at least in part by a processor, comprising:
a configuration user interface provided for each of multiple listener objects, said listener objects being embodied on a computer-readable storage medium and enabling configuration features of the speech system to be enabled or disabled for each of the listener objects;
multiple speech-enabled applications, each speech-enabled application being associated with a listener object; and
A speech manager configured to provide a global system speech grammar to each speech-enabled application, to maintain a list of loaded and executing listener objects, to set up connections between listener objects and a speech recognition engine, and to control communications between the speech system and each listener object, wherein the speech manager dispatches communication events to one or more of the multiple listener objects based on the list.

35. The speech system as recited in claim 34, further comprising a "What Can I Say" (WCIS") user interface commonly available to each of the listener objects, the WCIS user interface communicating to a user at least a subset of commands available for a speech-enabled application associated with a listener object.

36. a speech manager interface for use in a speech system, implemented at least in part by a processor, the speech manager interface comprising:
an initialization method to set up connections between multiple software-implemented speech system listener objects and a speech engine in the speech system, wherein the one or more of the multiple software-implemented speech system listener objects receives communication events dispatched from a speech manager based on a list of loaded and executing listener objects maintained by the speech manager;
a run method to activate and de-activate the speech system; and
A configure method to instruct the speech system to display a configuration graphical user interface.

37. The speech manager interface as recited in claim 36, further comprising a "What Can I Say?" method to instruct the speech system to display a "What Can I Say?" graphical user interface.

38. The speech manager interface as recited in claim 36, further comprising a shutdown method to shut down the speech system.

39. a speech manager interface for use in a speech system implemented at least in part by a processor, the speech system interface comprising:
an initialization method to set up connections between multiple speech system listener objects embodied on a computer-readable storage medium and a speech engine in the speech system, wherein the one or more of the multiple system listener objects receives communication events dispatched by a speech manager based on a list of loaded and executing listener objects maintained by the speech manager;
a run method to activate and de-activate the speech system; and a "What Can I Say?" method to instruct the speech stem to display a "What Can I Say?" graphical user interface.

40. The speech manager interface as recited in claim 39, further comprising a configure method to instruct the speech system to display a configuration graphical user interface.

41. The speech manager interface as recited in claim 39, further comprising a shutdown method to shut down the speech system.

42. A listener interface in a listener object, said listener object embodied on a computer-readable storage medium, for use with a speech system, comprising:
an initialize method to transmit a listener recognition context to the speech system, wherein the listener object receives communication events dispatched by a speech manager based on a list of loaded and executing listener objects maintained by the speech manger;
a suspend method to notify the listener object that the speech system is de-activated;
a resume method to notify the listener object that the speech system is activated; and a "What Can I Say?" method to notify the listener object that a speech system user has requested the "What Can I Say?" user interface to be displayed.

43. The listener interface as recited in claim 42, further comprising an on focus changed method that informs the listener object that a speech-enabled application associated with the listener object has focus.

44. A speech site interface for use in a speech system implemented at least in part by a processor, the speech site interface comprising:

A notify on event method that instructs the speech system to call a notification sink to allow a listener object connected to the speech system to set up a notification callback mechanism without having to implement a separate thread to monitor speech system activities; wherein the listener object receives communication events dispatched by a speech manager based on a list of loaded and executing listener objects maintained by the speech manager; and a text feedback method to allow a listener object connected to the speech system to inform a speech system user of pending speech system actions.

* * * * *